US010802899B2

(12) United States Patent
Martin et al.

(10) Patent No.: US 10,802,899 B2
(45) Date of Patent: Oct. 13, 2020

(54) DRILLING TUBULAR IDENTIFICATION

(71) Applicant: Transocean Sedco Forex Ventures Limited, George Town Grand Cayman (KY)

(72) Inventors: Trenton K. Martin, Kingwood, TX (US); John Kozicz, Houston, TX (US)

(73) Assignee: Transocean Sedco Forex Ventures Limited, Grand Cayman (KY)

( * ) Notice: Subject to any disclaimer, the term of this patent is extended or adjusted under 35 U.S.C. 154(b) by 119 days.

(21) Appl. No.: 16/018,959

(22) Filed: Jun. 26, 2018

(65) Prior Publication Data
US 2019/0004882 A1    Jan. 3, 2019

Related U.S. Application Data

(60) Provisional application No. 62/528,309, filed on Jul. 3, 2017.

(51) Int. Cl.
| | | |
|---|---|---|
| G06F 11/30 | (2006.01) | |
| G06F 11/00 | (2006.01) | |
| E21B 19/16 | (2006.01) | |
| E21B 47/00 | (2012.01) | |
| E21B 17/00 | (2006.01) | |
| E21B 44/04 | (2006.01) | |
| G06F 17/40 | (2006.01) | |

(52) U.S. Cl.
CPC .......... *G06F 11/006* (2013.01); *E21B 17/006* (2013.01); *E21B 19/165* (2013.01); *E21B 47/00* (2013.01); *E21B 44/04* (2013.01); *G06F 17/40* (2013.01)

(58) Field of Classification Search
CPC ............................ G06F 11/006; G06F 11/3476
USPC ........................................................ 714/40, 45
See application file for complete search history.

(56) References Cited

U.S. PATENT DOCUMENTS

| | | | |
|---|---|---|---|
| 2009/0173538 A1* | 7/2009 | Estes | E21B 44/00 |
| | | | 175/24 |
| 2012/0181084 A1 | 7/2012 | Pilgrim | |
| 2015/0021016 A1 | 1/2015 | Deng et al. | |
| 2016/0053605 A1* | 2/2016 | Abbassian | E21B 44/00 |
| | | | 702/6 |
| 2019/0136685 A1* | 5/2019 | Adetola | E21B 47/0905 |

FOREIGN PATENT DOCUMENTS

| | | |
|---|---|---|
| EP | 0148003 A1 | 6/1988 |
| EP | 2288783 B1 | 2/2016 |
| RU | 2615329 C1 | 4/2017 |

OTHER PUBLICATIONS

International Search Report and Written Opinion issued by the International Searching Authority for Application No. PCT/US2018/039529 dated Sep. 14, 2018, 12 pages.

* cited by examiner

*Primary Examiner* — Chae M Ko (57) ABSTRACT

A tubular connection made during various oil and/or gas operations such as a tripping operation can be identified based on received data such as hookload and/or block position data. A type of tubular connected can also identified by comparing hookload and/or block position data to a tubular specification database. The identification of the tubular connection and/or type of tubular connected can be used to measure a machine sequence, such as a tripping sequence. The measurement of the machine sequence can be used to optimize an operation such as a tripping or drilling operation.

20 Claims, 6 Drawing Sheets

DRILLING TUBULAR IDENTIFICATION

CROSS REFERENCE TO RELATED APPLICATIONS

This Application claims the benefit of U.S. Provisional Application No. 62/528,309 to Martin et al. entitled "Drilling Tubular Identification" and filed on Jul. 3, 2017 which is hereby incorporated by reference.

TECHNICAL FIELD

The present invention relates generally to parameters of a drilling operation, and more specifically, but not by way of limitation, to identification and classification of a tubular and drilling connection for a tubular.

BACKGROUND

During tripping, drilling, and other operations of an oil well, it is general practice to monitor and record certain parameters via, e.g., sensors for the purpose of optimizing operations and detecting operational problems. Sometimes equipment movement is recorded as well. In a tripping operation, the type and configuration of tubulars tripped into or out of wells are generally recorded manually, which can result in errors for tubular connections, as well as misidentification of the type of tubulars connected. Erroneous connections and misidentification of tubulars can make it difficult to evaluate the effectiveness of a machine sequence interval for a particular tubular used in various operations such as tripping or drilling operations. Signals from automated or instrumented slips can be leveraged, but relying on this signal is error prone and manual slips are frequently used.

SUMMARY

Tubular connections and the type and configuration of tubular connected may be identified during various operations by receiving and analyzing operational data. For example, when tubulars in housing systems, horizontal and vertical pipehandling systems, tubular torqueing and connecting systems, and other systems, are handled operational data may be collected, received, and/or analyzed. Such systems can include hoisting mechanisms such as a traveling block and/or top drive for moving tubulars. Based on the identification of tubular connections and/or the type and configuration of tubular connected, operation of one or more systems may be optimized.

As used herein, the term tubular includes, but is not limited to, drill pipe, casing, drill collars, or risers, a tubular stand, and other tuber shape structures. Tubulars run or removed together can be referred to together as a tubular stand. Two tubulars run or removed together can be referred to as a "double," three tubulars run or removed together can be referred to as a "triple," and so on.

A method of identifying a tubular connection may include identifying a tripping operation, including whether a tripping operation has commenced and the direction of the tripping operation; and identifying the tubular connection by receiving hookload and block position data over a time interval and determining based at least in part on the hookload and block position data that a tubular connection has been made. This determination can be used to accurately measure a machine sequence and then, if desired, to optimize a tripping, drilling, or other operation. In some embodiments, the identification of the tripping operation can be performed by receiving data manually entered into an interface, such as a computer, by a user, such as an operator. Alternatively or additionally, the identification of the tripping operation can be performed by receiving data at an interface, such as a computer, by one or more sensors. In any of these embodiments, the data can include vertical block position data, hookload data, bit data, standpipe data, mud pump data, top drive data, or other kinds of data. The connection identification can include determining the local maximum and/or local minimum pairs of the hookload and block position data over the time interval. In some embodiments, the method can include receiving edge connection data from a sensor, such as the sensor transmitting hookload data or another sensor, and refining the tubular connection determination based on the edge connection data. In some embodiments, the edge connection data is not received from a sensor transmitting the hookload data. The tubular connection determination can also be refined iteratively by using data associated with a prior identification of a tubular connection to identify a present tubular connection.

In some embodiments, the determination of the tubular connection and other data can be used to identify the type of connected tubular by comparing at least a portion of the received hookload and block position data to a database. The identification of the type and/or configuration of tubular can be used to more accurately measure a machine sequence and then, if desired, to optimize a tripping, drilling, or other operation. In some embodiments, the identification of the tubular can be received in the database in order to increase the accuracy and scope of the database. The database may be hosted on a local server or may be a cloud database hosted on one or more remote servers. The database may contain data collected from multiple tubular systems at multiple locations. In addition to the identification of prior tubulars, the database can include known tubular specification data such as the overall weight, overall length, expected tolerances, and connection data of various tubulars.

Some embodiments include an apparatus with various modules configured to perform various steps of an identification method. Such modules can include a tripping identification module configured to receive machine tool data and output tripping data based at least in part on the machine tool data. The output tripping data can include whether a tripping operation has commenced and the direction of the tripping operation. A tubular connection identification module can be configured to receive the tripping data and output connection cycle data based at least in part on the tripping data. The output connection cycle data can include whether a connection was made. A tubular identifier module can be configured to receive the connection cycle data and output tubular type data based at least in part on the connection cycle data. The output tubular type data can include the type of tubular connected. A machine sequence measurement module can be configured to receive the connection data and/or tubular type data and output a machine sequence measurement based at least in part on the connection cycle data and/or tubular type data. An operation optimizer module can be configured to receive the machine sequence measurement and optimize an operation based at least in part on machine sequence measurement. In other embodiments, the apparatus may be processor with or without the above exemplary modules.

In some embodiments, a computer program product may include a non-transitory computer readable medium comprising code to perform steps including identifying a tripping operation, including whether a tripping operation has commenced and the direction of the tripping operation and identifying a tubular connection made during the tripping operation based, at least in part, on hookload and block position data over a time interval, and other functions described herein.

BRIEF DESCRIPTION OF THE DRAWINGS

The following drawings illustrate by way of example and not limitation. Identical reference numbers do not necessarily indicate an identical feature. Rather, the same reference number may be used to indicate a similar feature or a feature with similar functionality, as may non-identical reference numbers.

DETAILED DESCRIPTION

The following detailed description refers to embodiments of the disclosure associated with operations of an oil or gas well that can include a tower or derrick with a travelling block. In the embodiments described, the tower or derrick can be used in a tripping operation to trip tubulars into or out of a well.

Figure 1A:
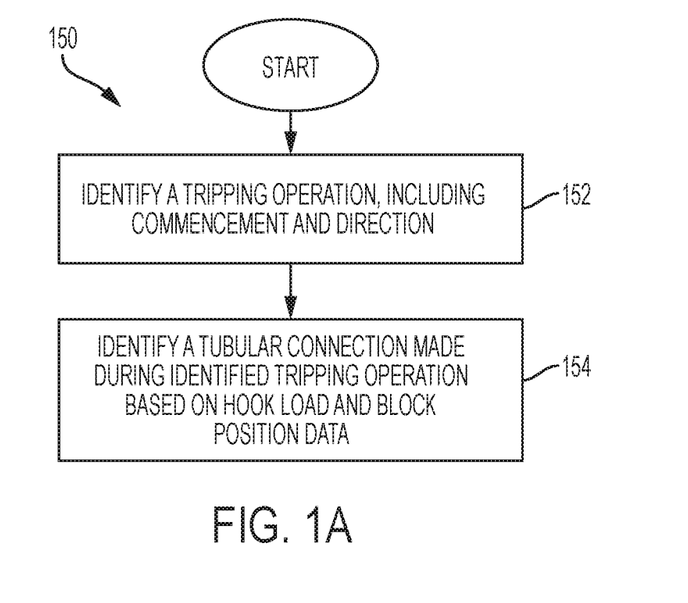
FIG. 1A depicts a flow chart illustrating a method of identification according to some embodiments of the disclosure.

Referring to the drawings, FIG. 1A depicts a flow chart illustrating a method 150 of identification according to some embodiments of the disclosure. The method 150 may include, at block 152, identifying a tripping operation, including whether a tripping operation has commenced and the direction of the tripping operation, and, at block 154, identifying a tubular connection by receiving hookload and block position data over a time interval and determining based at least in part on the hookload and block position data that a tubular connection has been made. This determination can be used to more accurately measure a machine sequence and, in some embodiments, to optimize a tripping, drilling, or other operation.

Figure 1B:
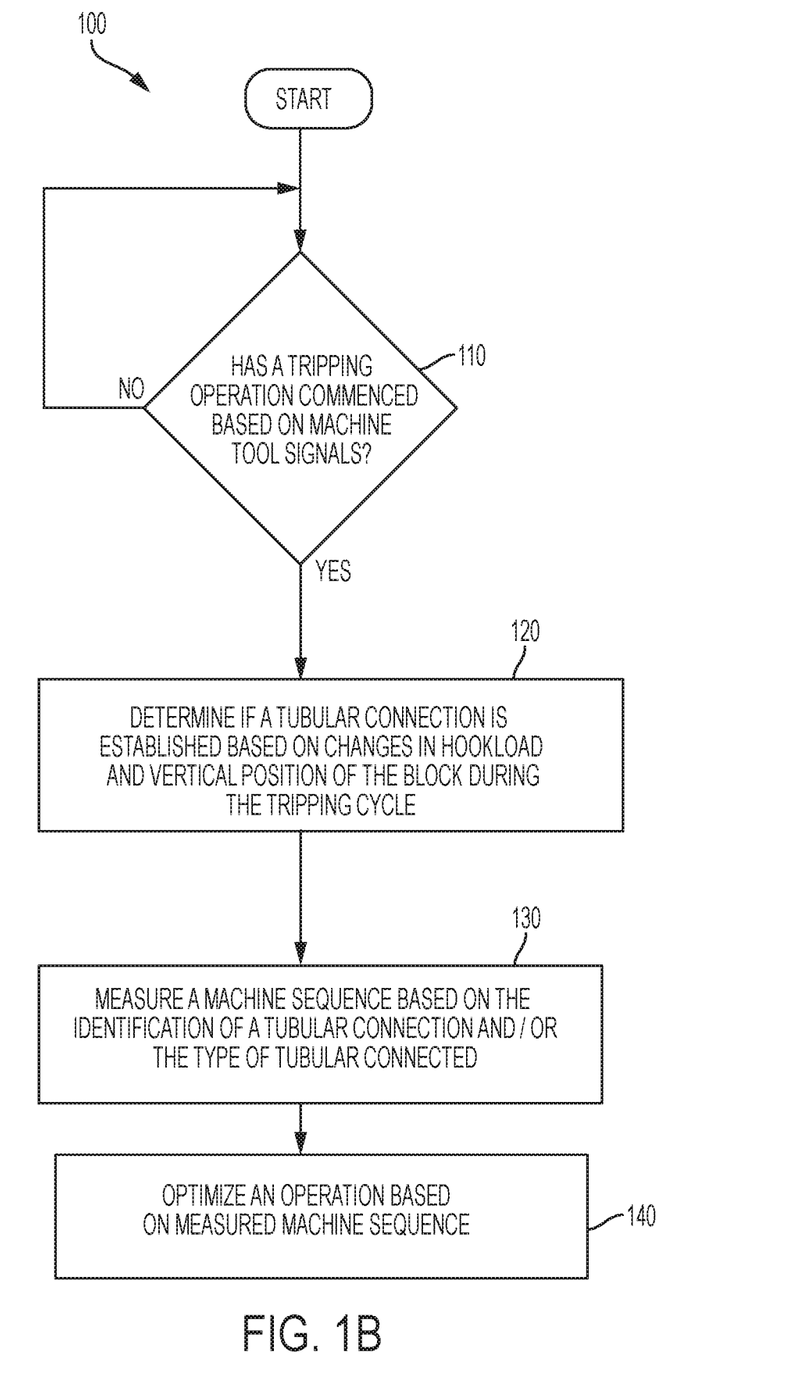
FIGS. 1B and 2 depict a flow chart and block diagram, respectively, illustrating a method and system of identification according to some embodiments of the disclosure.

FIG. 1B depicts a flow chart of a method 100 for identifying whether a tubular connection has been made during a tripping operation and/or the type of tubular connected. Method 100 may begin at step 110 with identifying whether a tripping operation has commenced, which can also include identifying a direction of the tripping operation, e.g., into or out of a well. This determination can be made based on data received from various machine tool signals or observations of an individual such as an operator. If a tripping operation has not commenced, then step 110 repeats, i.e., an operator continues to observe whether a tripping operation has commenced or a processor continues to monitor machine tool signals. If a tripping operation has commenced, a determination may be made, at step 120 of whether a tubular connection is established. This determination can be made based on changes in the hookload on the traveling block as well as the relative vertical position of the traveling block during a tripping cycle or on other available and relevant signals. For example, if a tubular is being tripped into a well, then the traveling block of the tower or derrick can be loaded with a tubular causing an increase in the hookload on the traveling block. The traveling block can lower the tubular into the well causing a change in the relative vertical position of the block. Thus, the hookload on the traveling block and relative vertical position of the traveling block can be used to determine if a tubular connection has been successfully made. The determination of whether or not a successful tubular connection was made and associated information can be used in third step 130 to measure a machine sequence. A machine sequence can be a sequence such as the steps in a tripping operation, and the tubular connection information can be used, for example, to measure how long it takes to perform a tripping operation and the frequency of successful trips. This measurement can be used in final step 140 to optimize an operation, such as a tripping operation or drilling operation. For example, positioning a subsequent tubular in a tripping operation may be coordinated with the time it takes to make a tubular connection to ensure the subsequent tubular is ready to be received by the traveling block immediately after a successful connection.

Optionally, identification method 100 may also include an intermediate step after second step 120 wherein the type of tubular connected is identified. The type of tubular can be identified based on the whether or not a tubular connection was identified in second step 120 and by comparing other information, such as the hookload on the traveling block and/or the relative vertical position of the traveling block, with a tubular database. A tubular database can be created based on characteristics of types of tubulars such as their weight, length, threading/connection types, and/or expected tolerances. This information may be determined from specification data and/or tubular connection data received during prior performance of identification method 100, i.e., in an iterative process. As an example, to determine the type of tubular connected in a tripping operation, the change in hookload on the traveling block and the change in vertical position of the traveling block during that operation may be compared to known weights and lengths, respectively of tubulars, such that the tubular with the same or similar weight and length is identified as the tubular connected in the tripping operation. Once identified, the type of tubular can be used in third step 130 to measure a machine sequence. For example, a machine sequence for tripping-in a specific type of tubular can be measured. Such measurement can used in final step 140 to optimize an operation, such as a tripping operation or a drilling operation. For example, if certain types of tubulars take longer to connect than other types of tubulars, this information may be used to more efficiently ensure the next tubular is in position to be connected immediately after a successful tubular connection is made. Optimization can be in the form of tool sequence, position, and speed, as well as tool optimization.

Figure 2:
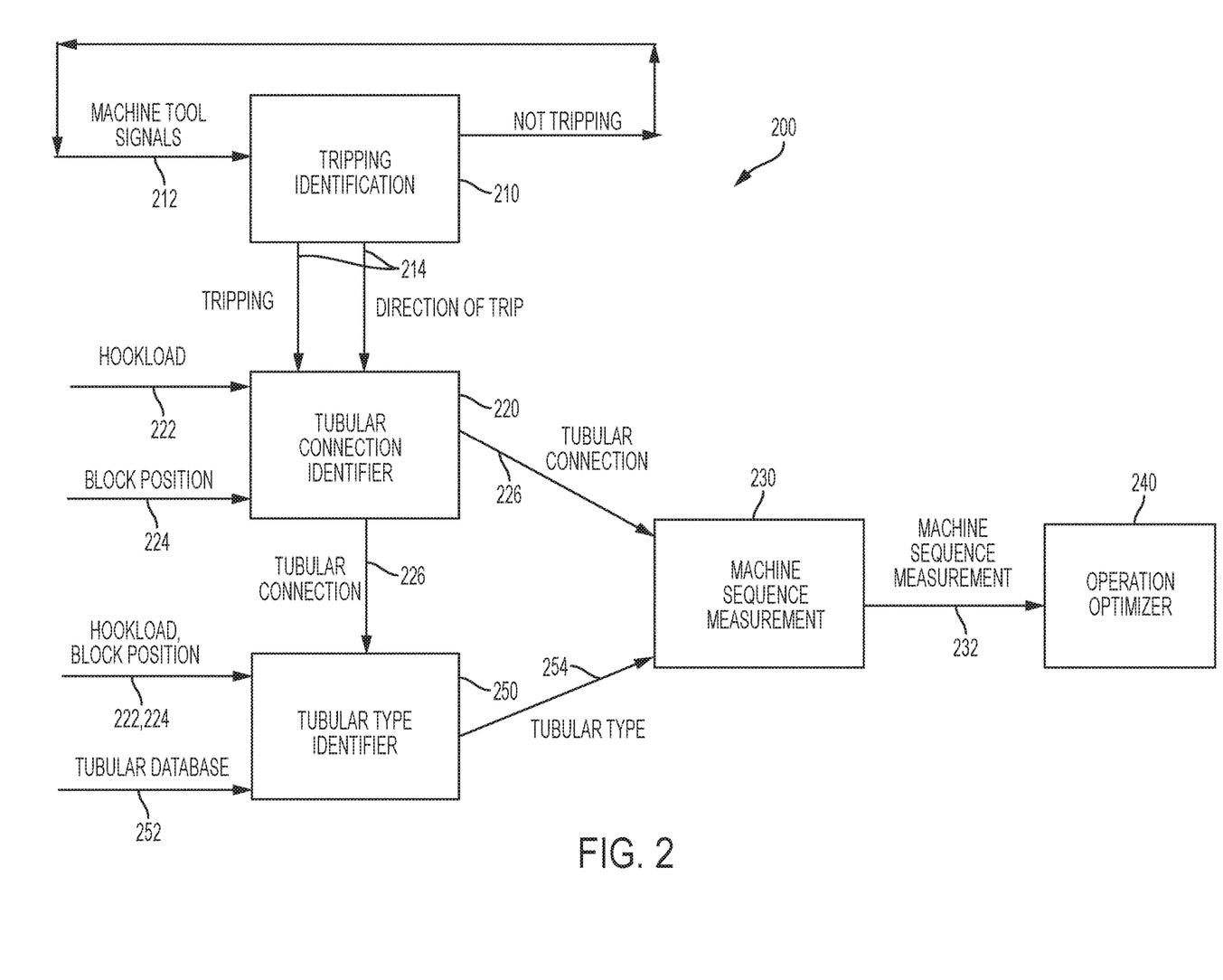

FIG. 2 depicts a block diagram of identification system 200 that could perform identification method 100. As shown, tripping identification module 210 receives machine tool signals 212 and determines if a tripping operation has commenced. If not, tripping identification module 210 continues to receive and analyze machine tool signals to determine if a tripping operation has commenced. Once tripping identification module 210 identifies commencement of a tripping operation, it can communicate that information as well as the direction of the tripping operation, e.g., into or out of a well, as tripping data 214 to tubular connection identifier module 220. Tubular connection identifier module 220 can also receive hookload data 222 and vertical block position data 224 and, as discussed above with reference to FIG. 1B, determine whether a tubular connection has been made. This information can be communicated as tubular connection data 226 to machine sequence measurement module 230 and/or tubular type identifier module 250. Tubular type identifier module 250 can receive hookload and relative vertical block position data 222, 224, respectively, and compare it to tubular database data 252, as discussed above with reference to FIG. 1B. For example a tubular type may be selected from the tubular database 252 with hookload and relative vertical block position data similar to the hookload and relative vertical block position data 222, 224 received by the tubular type identifier 250. Tubular type data 254, generated based on the comparison between the tubular database data 252 and the hookload and relative vertical block position data 222, 224, may be provided to machine sequence measurement module 230, which can measure a machine sequence, such as a tripping sequence, based on at least a portion of this data, as discussed with reference to FIG. 1B. Machine sequence measurement module 230 can communicate machine sequence measurement data 232 to operation optimizer module 240, which can optimize an operation, as discussed with reference to FIG. 1B. Machine tool signals 212, hookload data 222, and block position data 224, as well as other signals received by the above-described modules can be communicated to the modules via sensors. For example, an optical, altitude or other sensor may determine a relative vertical block position of a traveling block and a weight sensor may determine a hookload. Communication between any or all of the above described modules can be performed through electronic signals, including wireless transmission. Determinations and other information can be communicated and performed automatically or manually, e.g., by a user such as an operator.

Figure 3:
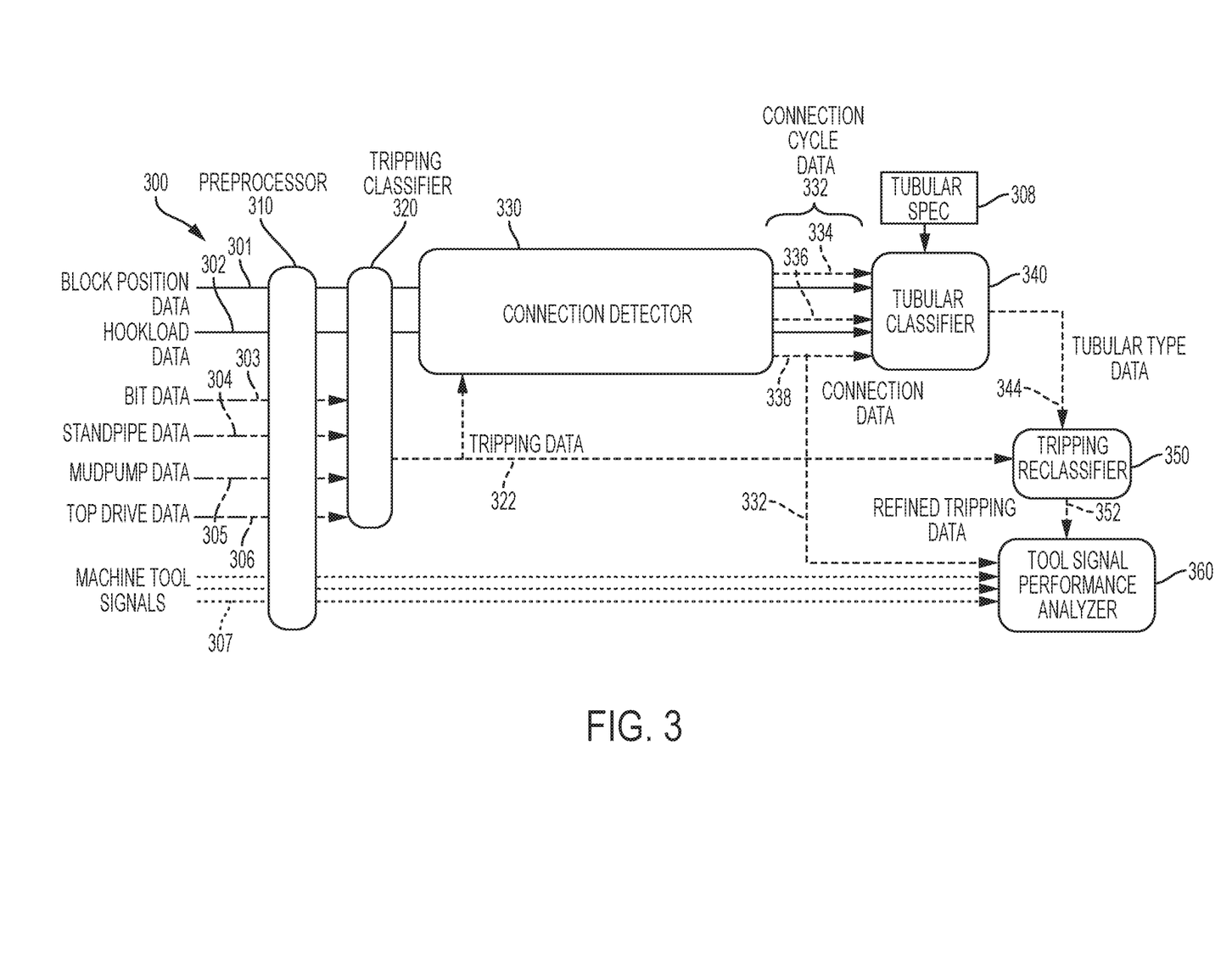
FIG. 3 depicts a block diagram of an identification system according to some embodiments of the disclosure.

An embodiment of an identification system is described with reference to FIGS. 3-5. FIG. 3 depicts a block diagram of data processing system 300. Data processing system 300 includes a number of modules, including preprocessor 310, tripping classifier 320, connection detector 330, tubular classifier 340, tripping reclassifier 350, and tool signal performance analyzer 360. Modules 310, 320, 330, 340, 350, and 360 may be included in an interface, such as a computer, that is configured to receive and process data, and/or communicate the processed data to another interface. Alternatively, each of modules 310, 320, 330, 340, 350, and 360 may include an interface, such as a computer, that is configured to receive and process data, and/or communicate the processed data to another interface. Data can be manually entered into the interface by a user, such as an operator, or communicated via other means, such as a sensor or module. For example, interfaces may include or be coupled to sensors such as optical sensors, weight sensors, motion sensors, pressure sensors, and other sensors. Modules 310, 320, 330, 340, 350, and 360 may also or alternatively include code configured to perform certain operations in logic circuitry, such as a processor or ASIC. In some embodiments, combinations of the modules 310, 320, 330, 340, 350, and 360 may be executed by the same processor by executing different code.

Preprocessor 310 may perform processes for data management such as data cleaning, outlier detection, unit conversion, and other steps to prepare data prior to being received by other modules. For example, data from sensors may be processed by preprocessor 310 prior to being received by modules 320, 330, 340, 350, and 360. Processing data by preprocessor 310 is not required in some circumstances.

Tripping classifier 320 may receive data from preprocessor 310, and may determine, based on the data, if tubulars are being tripped and, if so, the direction of tripping, such as into or out of a wellbore. The determination is output from the tripping classifier 320 as tripping data 322 to connection detector 330 and to tripping reclassifier 350. Inputs for tripping classifier 320 can include, but are not limited to, block position data 301, hookload (e.g., load measurement) data 302, bit data 303, standpipe data 304, mud pump data 305, top drive data 306, and/or various machine tool signals 307. Block position data 301 can include the vertical position of the block relative to a rotary table or other reference. Hookload data 302 can include all or a portion of the weight of the load hoisted by the block. Bit data 303 can include the type of bit and the bit depth. Standpipe data 304 can include the pressure measured in the standpipe. Mud pump data 305 can include whether mud pumps are running and at what pressure and/or flow rate. Top drive data 306 can include the torque and rotational velocity of the top drive.

Connection detector 330 may receive tripping data 322, and optionally one or more of block position data 301 and hookload data 302. Connection detector 330 may determine, based on the received data, whether a tubular was connected. Connection detector 330 may also determine characteristics of the connection. These determinations may be represented as connection cycle data 332, which can include local block position data 334, local hookload data 336, and/or connection data 338. Some or all of connection cycle data 332 may be output to tubular classifier 340 and/or tool signal performance analyzer 360. Local block position data 334 may include the local maximum and minimum pairs of the vertical position of the block during a particular cycle of a tripping operation, such as during connection cycle 402 (see FIGS. 4A-B). Similarly, local hookload data 336 may include the local maximum and minimum pairs of the hookload on the block during the particular cycle of the tripping operation, e.g., connection cycle 402. Connection data 338 may include a determination that a tubular was connected or disconnected during the connection cycle of the tripping operation. An exemplary way in which connection detector 330 may make such a determination is explained with reference to FIGS. 4A-B.

Figure 4A:
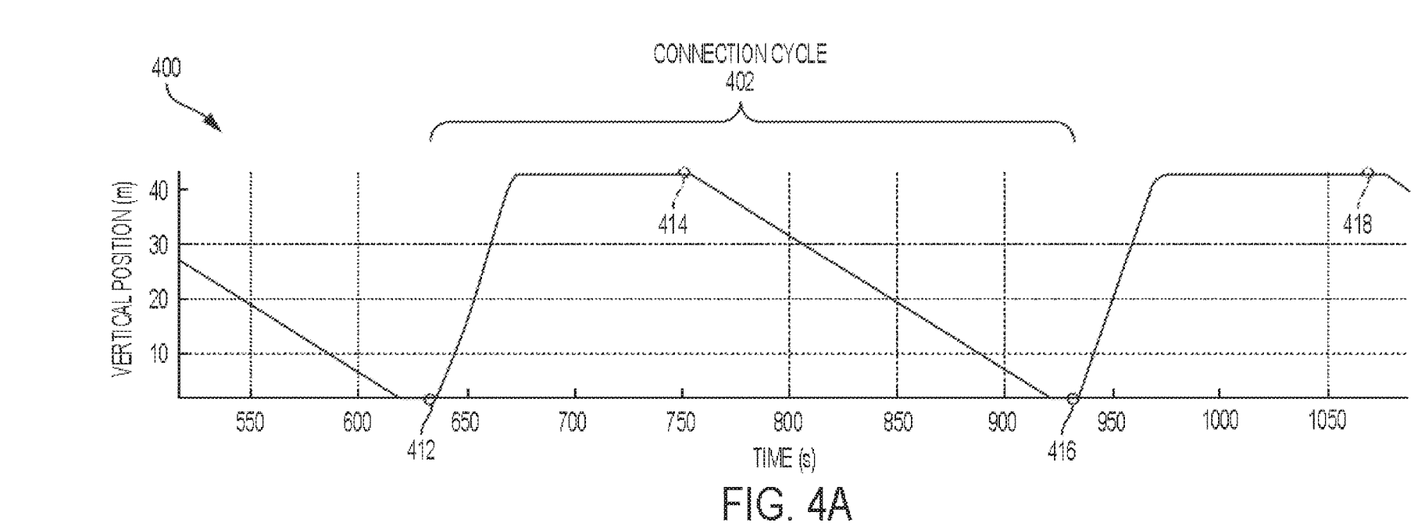
FIGS. 4A-B depict graphs of certain information used in the identification system of FIG. 3 according to some embodiments of the disclosure.
Figure 4B:
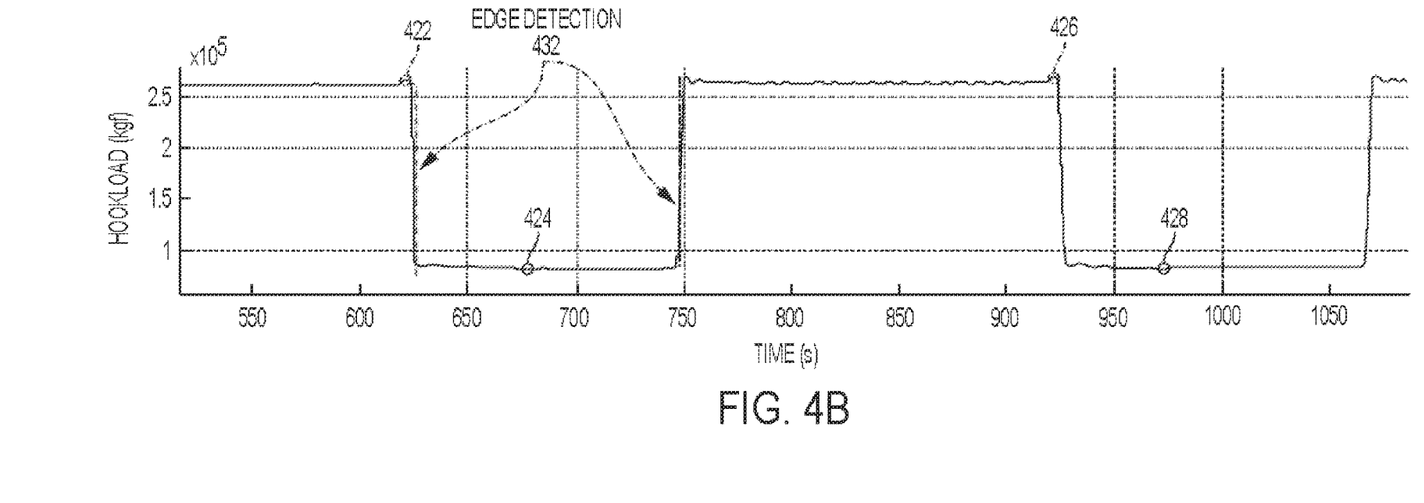

FIGS. 4A-B depict graphs 400 of sample data that may be received by connection detector 330. The graph shown in FIG. 4A shows vertical block position data 301 over time. The vertical block position displayed along the y-axis can be relative to a rotary table location or another location. The graph shown in FIG. 4B shows hookload data 302 over a time interval. Connection detector 330 can determine based on this sample data that a tubular connection was successfully made or unmade over a connection cycle such as connection cycle 402, which occurs from approximately time 630 seconds until approximately time 930 seconds. Connection cycle 402 can generally represent a tripping-in cycle. During connection cycle 402, connection detector 330 may receive hookload data 302 indicating an initial hookload of approximately 70,000 kgf at approximately time 630 at point 422 of FIG. 4B and may receive block position data 301 indicating a relative vertical position of approximately zero meters at approximately time 640 at point 412 of FIG. 4A. This data could be interpreted as an unloaded block at a make-up location. From approximately time 630 seconds to approximately time 675 seconds, connection detector 330 may receive block position data 301 indicating an increase in relative vertical block position to approximately 42 meters. During this same time interval, hookload data 302 may indicate little change in the hookload on the block. These data could be interpreted as the unloaded block being raised to a position to receive a tubular. From approximately time 745 seconds until approximately time 750 seconds, connection detector 330 may receive hookload data 302 indicating a dramatic increase in hookload on the block to approximately 270,000 kgf. This data could be interpreted as the block receiving a tubular. From approximately time 750 seconds until approximately time 920 seconds, connection detector 330 may receive block position data 301 indicating a relatively gradual decrease back to a relative vertical position of approximately zero meters. During this same time, hookload data 302 may indicate little change in hookload on the block. These data may indicate the block lowering the tubular to make-up height. From approximately time 925 seconds to approximately time 930 seconds, connection detector 330 may receive hookload data 302 indicating a dramatic decrease in hookload back to approximately 70,000 kgf while, during this same time, block position data 301 indicates little change in relative vertical block position. These data may indicate connecting the tubular to a tubing string and removing the tubular from the block. As a whole, the data received during connection cycle 402 can indicate a successfully made connection. This determination can be output to tubular classifier 340 and/or tool signal performance analyzer 360 as connection data 338. Tool signal performance analyzer 360 can incorporate this data, as well as other data such as machine tool signals 307 from other machine tools or refined tripping data 352, as discussed primarily with reference to FIG. 5 below, into a measurement of a machine sequence, such as a sequence of positioning subsequent tubulars near a hoisting assembly, as discussed with reference to FIGS. 1B and 2 above. Based on this measurement, an operation, such as a tripping or drilling operation, that employs the machine sequence can be optimized, again as discussed with reference to FIGS. 1B and 2 above. For example, a speed with which subsequent tubulars are positioned near a hoisting assembly may be adjusted.

The accuracy of determinations by the connection detector 330 can be increased by receiving, as part of hookload data 302 or from other sources, such as an automated slip engagement system or other supporting machines signals (e.g., pumps), edge detection data 432. Edge connection data 432 can be determined by performing an algorithm on received data to more accurately determine the time a connection is made. The accuracy of a tubular connection determination can also be refined iteratively by using data associated with a prior identification of a tubular connection to identify a present tubular connection. Connection detector 330 can also perform other operations to increase the accuracy of a tubular connection determination such as a threshold rejection operation. For example, it can identify threshold crossing for load signals (e.g., hookload), equipment positions (e.g., vertical block position), and other complimentary drilling instrumentation measurements. As the accuracy of the detection of the connection interval improves, so will the confidence in the tubular classification performed in tubular classifier 340.

Local block position data 334 for connection cycle 402 can be determined by taking the difference between local block position maximum 414 and local block position minimum 416 to determine the greatest change in relative vertical block position during connection cycle 402. Likewise, a difference between an earlier local block position maximum (not shown) and an earlier local block position minimum 412 or a later local block position maximum 418 and a later local block position minimum (not shown) can be used to determine a greatest change in relative vertical block position during an earlier or later connection cycle. Local hookload data 336 for connection cycle 402 can be determined by taking the difference between the local hookload maximum 426 and local hookload minimum 424 to determine the greatest change in relative hookload during connection cycle 402. Likewise, a difference could be determined between an earlier local hookload maximum 422 and an earlier local hookload minimum (not shown) or between a later local hookload maximum (not shown) and a later local hookload minimum 428 to determine a greatest change in relative hookload during an earlier or later connection cycle. Local block position data 334 and local hookload data 336 can then be communicated to tubular classifier 340, along with connection data 338 and tubular specification data 308. Tubular specification data 308 can include various types of data associated with standard and/or non-standard tubulars such as overall length, overall weight, expected tolerances, and/or connection types. Tubular specification data 308 can include data associated with drill pipe, drill collars, risers, including riser slick or pup joints, or other types of tubulars.

Tubular classifier 340 can receive connection cycle data 332 and determine, e.g., based on a comparison of this data to tubular specification data 308, the type of tubular connected during the connection cycle. Tubular classifier 340 can be capable of discriminating amongst tubular and/or tubular stand data. Tubulars can be classified by tubular classifier 340 based on a simple rules based model, a machine learning approach, a combination of the two, or another method. A simple rules based model can be, for example, to classify a tubular associated with certain connection cycle data, e.g., connection cycle 402, based on whether connection cycle data 338 defines a tubular having a certain length and/or weight that generally matches the length and/or weight of a specific tubular, e.g., as found in tubular specification data 308. A machine learning or statistical approach can be, for example, to classify a tubular associated with certain connection cycle data 338, e.g., for connection cycle 402, based on previously received connection cycle data and classification of prior tubulars. Once made, the determination of tubular type can be communicated as tubular type data 344 to tripping reclassifier 350. One example of generating tubular type data 344 is discussed with reference to FIG. 5.

Figure 5:
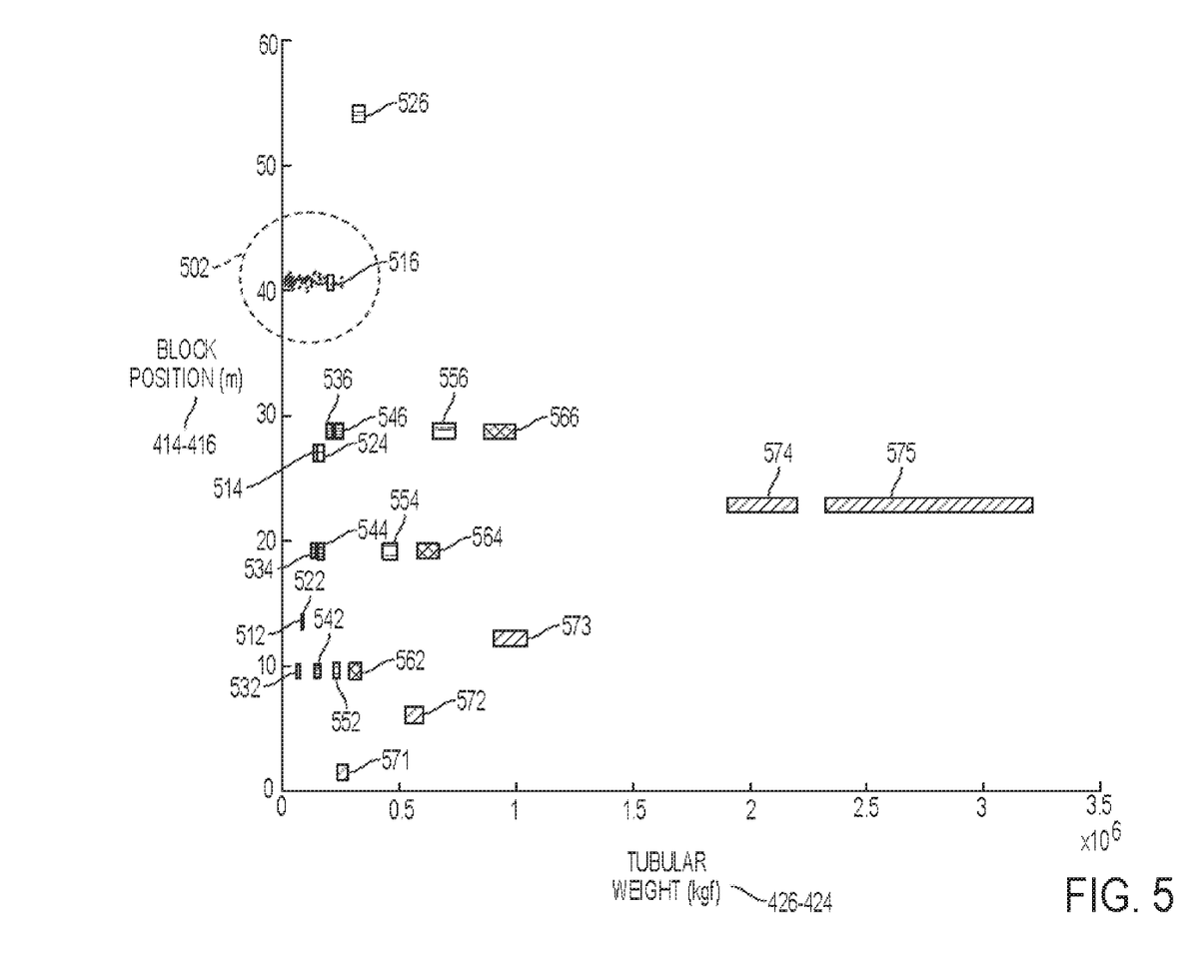
FIG. 5 depicts another graph of certain information used in the identification system of FIG. 3 according to some embodiments of the disclosure.

FIG. 5 depicts a graph of at least a portion of connection cycle data 332 received by tubular classifier 340 during connection cycle 402 as well as tubular specification data 308, all plotted against the weight of the tubular along the x-axis and the length of the tubular along the y-axis. Tubular specification data 308 is represented by data bands 512, 514, 516, 522, 524, 526, 532, 534, 536, 542, 544, 546, 552, 554, 556, 562, 564, 566, 571, 572, 573, 574, and 575. Tubular specification data 512, 514, 516 refers to single, double, and triple sections, respectively, of drill pipe having an outer diameter of 6⅝ inches and a FH34 connection. Tubular specification data 522, 524, 526 refers to single, double, and triple sections, respectively, of drill pipe having an outer diameter of 6⅝ inches and a FH40 connection. Tubular data 532, 534, 536 refers to single, double, and triple sections, respectively, of drill collars having a NC38 connection. Tubular data 542, 544, 546 refers to single, double, and triple sections, respectively, of drill collars having a NC50 connection. Tubular data 552, 554, 556 refers to single, double, and triple sections, respectively, of drill collars having an outer diameter of 6⅝ inches. Tubular data 562, 564, 566 refers to single, double, and triple sections, respectively, of drill collars having an outer diameter of 7⅝ inches. Tubular data 571, 572, 573, 574, and 575 refers to risers with a length of 3000 feet, risers with a length of 5000 feet, risers with a length of 7000 feet, risers with a length of 9000 feet, and risers with a length of 10000 feet, respectively.

Location 502 on the graph of FIG. 5 includes at least a portion of connection cycle data 332 received by tubular classifier 340 during connection cycle 402. This portion of connection cycle data 332 can be plotted on the x-axis of the graph of FIG. 5 by equating the weight of the to-be-identified tubular to the difference between the loaded, i.e., peak, hookload and unloaded hookload experienced by the block during a connection cycle. For example, the weight of the tubular connected during connection cycle 402 can be equated to the difference between maximum hookload 426 and minimum hookload 424. Similarly, this portion of connection cycle data 332 can be plotted on the y-axis of the graph of FIG. 5 by equating the length of the to-be-identified tubular to the difference between the maximum vertical block position and minimum vertical block position during a connection cycle. For example, the length of the tubular connected during connection cycle 402 can be equated to the difference between the maximum vertical block position 414 and minimum vertical block position 416.

As shown, location 502 also includes tubular specification data band 516, which corresponds to a triple section of drill pipe having an outer diameter of 6⅝ inches and a FH34 connection. In this circumstance, tubular classifier 340 can interpret connection cycle data 332 received during connection cycle 402 as connection of a triple section of drill pipe having an outer diameter of 6⅝ inches and a FH34 connection. This determination could be output as tubular type data 344 to tripping reclassifier 350.

Tripping reclassifier 350 can receive tubular type data 344 and/or tripping data 322 and determine based on these data whether a tripping operation was performed, the direction of the trip, e.g., into or out of a wellbore, and the type of tubular that was tripped. This determination can then be output as refined tripping data 352 to tool signal performance analyzer 360.

Tool signal performance analyzer 360 can incorporate refined tripping data 352 as well as other data such as machine tool signals 307 and/or all or a portion of connection cycle data 332, such as connection data 338, into a measurement of a machine sequence and, based on this measurement, optimize an operation that employs the machine sequence, as discussed above.

The specific features of the methods for identifying tubulars is a specific process for evaluating tubulars using particular information and processing. Analysis and identification of the tubulars using the disclosed methods results in a technological improvement over the prior art manual solutions, which are tedious and prone to error. The methods thus describe a process specifically designed to achieve an improved technological result of improved drilling operations in the conventional industry practice of tripping. Furthermore, the methods describes new processes relating to the drilling operations and tripping that differs from conventional industry solutions.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

What is claimed is:

1. A method of identification comprising:
receiving, by a processor, data from at least one sensor;
identifying, by the processor, a tripping operation, including whether a tripping operation has commenced and a direction of the tripping operation based, at least in part, on the received data;
identifying, by the processor, a tubular connection made during the tripping operation based, at least in part, on the received data; and
identifying, by the processor, a tubular type associated with the tubular connection based, at least in part, on the received data.

2. The method of claim 1, further comprising measuring a machine sequence based, at least in part, on the identification of the tubular connection.

3. The method of claim 2, further comprising adjusting the tripping operation based, at least in part, on the measured machine sequence.

4. The method of claim 3, wherein adjusting the tripping operation comprises adjusting a timing of positioning of one or more tubulars to be tripped in the tripping operation based, at least in part, on the measured machine sequence.

5. The method of claim 1, wherein the received data comprises at least one of vertical block position data, hookload data, bit data, standpipe data, mud pump data, or top drive data.

6. The method of claim 1, wherein the received data comprises at least hookload and block position data over a time interval, and wherein the step of identifying, by the processor, the tubular connection is based, at least in part, on received hookload and block position data over a time interval.

7. The method of claim 6, wherein the step of identifying, by the processor, the tubular connection comprises determining a pair of a local maximum and a local minimum from the hookload and block position data over the time interval.

8. The method of claim 6, wherein the step of identifying, by the processor, the tubular connection comprises receiving edge connection data over the time interval, wherein the tubular connection identification is based, at least in part, on the edge connection data.

9. The method of claim 6, wherein the identifying the tubular type associated with the identified tubular connection includes comparing at least a portion of the hookload and block position data to a database, the identifying the tubular type being based on the hookload and block position data.

10. The method of claim 9, further comprising, after identifying the tubular type, transmitting the identification of the tubular type to the database.

11. An apparatus comprising:
- a tripping identifier configured to receive machine tool data and output tripping data based, at least in part, on the machine tool data, the tripping data including whether a tripping operation has commenced and a direction of the tripping operation;
- a tubular connection identifier configured to receive the tripping data and output connection cycle data based, at least in part, on the tripping data, the connection cycle data including whether a connection was made; and
- a tubular type identifier configured to receive the connection cycle data and output tubular type data based at least in part on the connection cycle data.

12. The apparatus of claim 11, further comprising a machine sequence measurer configured to receive the connection cycle data and output a machine sequence measurement based at least in part on the connection cycle data.

13. The apparatus of claim 11, wherein the tubular type identifier is further configured to receive hookload and block position data and output the tubular type data based at least in part on the hookload and block position data, the tubular type data including a type of tubular connected.

14. The apparatus of claim 11, wherein the tubular type identifier is further configured to receive tubular specification data and to output the tubular type data based, at least in part, on a comparison of the connection cycle data with the tubular specification data.

15. The apparatus of claim 11, further comprising a machine sequence measurer configured to receive the connection cycle data and the tubular type data, and output a machine sequence measurement based at least in part on the connection cycle data and tubular type data.

16. An apparatus, comprising:
- a processor configured to perform steps including:
  - receiving data from at least one sensor;
  - identifying a tripping operation, including whether a tripping operation has commenced and a direction of the tripping operation based, at least in part, on the received data;
  - identifying a tubular connection made during the tripping operation based, at least in part, on the received data; and
  - identifying a tubular type of the tubular connection based, at least in part, on the received data.

17. The apparatus of claim 16, wherein the received data includes at least one of vertical block position data, hookload data, bit data, standpipe data, mud pump data, or top drive data.

18. The apparatus of claim 16, wherein the processor is further configured to perform steps including measuring a machine sequence based, at least in part, on the identification of the tubular connection.

19. The apparatus of claim 16, wherein the received data includes at least one of hookload or block position data over a time interval, and wherein the step of identifying the tubular connection is based, at least in part, on the at least one of hookload or block position data over the time interval.

20. The apparatus of claim 19, wherein the processor is further configured to perform steps including identifying the tubular type of the tubular connection by comparing at least a portion of the hookload and block position data to a database.

* * * * *